United States Patent [19]

Contri et al.

[11] Patent Number: 4,673,798
[45] Date of Patent: Jun. 16, 1987

[54] DUAL TEMPERATURE ELECTRIC CURLING IRON HAVING A SAFETY SHUT-OFF CIRCUIT

[75] Inventors: Robert F. Contri, Westmont; William R. Hemrich, Glen Ellyn, both of Ill.

[73] Assignee: John Zink Company, Tulsa, Okla.

[21] Appl. No.: 847,360

[22] Filed: Apr. 2, 1986

[51] Int. Cl.⁴ .......................... H05B 1/02; A45D 1/04
[52] U.S. Cl. ........................................ 219/225; 132/9; 132/11 R; 132/37 R; 219/230; 219/240; 219/241; 219/248; 219/250; 219/251; 219/255; 219/506; 219/508
[58] Field of Search ................................. 219/222–226, 219/230, 240, 241, 248, 250, 251, 257, 254, 255, 506, 508; 132/9, 11 R, 31 R, 32 R, 34 R, 37 R, 37 A

[56] References Cited

U.S. PATENT DOCUMENTS

| | | | |
|---|---|---|---|
| 2,343,654 | 3/1944 | Finlayson | 219/251 |
| 2,382,587 | 8/1945 | Thomas | 219/257 |
| 2,648,757 | 8/1953 | Harper | 219/241 X |
| 4,203,101 | 5/1980 | Towsend | 219/250 X |
| 4,243,875 | 1/1981 | Chang | 219/247 X |
| 4,365,140 | 12/1982 | Bast et al. | 219/225 |
| 4,418,268 | 11/1983 | Munshaw | 219/247 X |
| 4,520,257 | 5/1985 | Schwob et al. | 219/250 |

FOREIGN PATENT DOCUMENTS

2158105 11/1985 United Kingdom ................ 219/250

Primary Examiner—Anthony Bartis
Attorney, Agent, or Firm—Neil M. Rose

[57] ABSTRACT

A dual temperature curling iron has a plastic handle and a metal barrel connected thereto. An electric heater positioned within the metal barrel and is arranged to rapidly heat the barrel and is selectively controlled by either a low temperature thermostat or a high temperature thermostat located within the barrel to provide heat to the metal barrel. A hair clamp is pivotally mounted on the metal barrel, and when opened, causes a switch to generate an in-use signal which is fed to a safety timing circuit. The timing circuit is reset each time it receives the in-use signal. In the event that no further in-use signals are received, the timing circuit, after a preselected interval, provides a signal to a silicon controlled rectifier which is connected to the electric heater causing the silicon controlled rectifier to interrupt electric power to the electric heater. The curling iron is provided with a visual signal for indicating that has reached the selected temperature and is ready for use.

7 Claims, 8 Drawing Figures

DUAL TEMPERATURE ELECTRIC CURLING IRON HAVING A SAFETY SHUT-OFF CIRCUIT

BACKGROUND OF THE INVENTION

The field of the invention generally relates to electric curling irons for conditioning a lock of hair.

Electric curling irons of various types are well known in the art. They are commonly used for curling hair by allowing the barrel of the iron to heat up, after which a lock of hair is wrapped about the barrel tightly for a short period of time and then released. Engagement of the hair with the barrel is assisted by a spring loaded pivoting metal clamp connected to the barrel which is opened to allow the hair to be brought into contact with the barrel and then closed after the hair is wrapped thereabout.

The prior art curling irons are commonly used by plugging them into a wall, switching them on and allowing them to heat up, often while the user is performing other tasks. Typically, it takes five to ten minutes for an electric curling iron to heat its maximum rated temperature. In the event that the user forgets to use the curling iron, the iron with its heated barrel presents a safety problem, particularly to small children who may be tempted to grasp the iron by its conveniently sized barrel and burn themselves severely.

In the past the only solutions for such a problem were to stay in the vicinity of the curling iron while it was heated which can render other activities less efficient, or unplug the curling iron whenever it is left alone.

What is needed is an apparatus which, in conjunction with the curling iron, is able to sense when the curling iron is not being used and interrupt the flow of electric power to the electric heater, allowing the curling iron to cool down.

SUMMARY OF THE INVENTION

An improved curling iron is disclosed herein which includes a safety circuit which disables a flow of electric current to the electric heater. The improved curling iron includes a plastic handle having a metal heat conductive barrel connected thereto. An electric cord is mounted in a plastic handle and is electrically connected to an electric resistance heater located in the barrel. A pivotal hair clamp is connected to the barrel and has an elongated blade section biased into contact with the barrel. A switch is mounted on the handle so that when the hair clamp is opened the switch is closed generating an in-use signal. The in-use signal is received by a digital timing circuit energized by the electric current. The digital timing circuit upon receipt of the in-use signal resets to time interval zero. In the preferred embodiment, if the curling iron remains energized and the digital timing circuit does not receive any further in-use signals indicating that the clamp has been opened, at the end of a fifteen minute interval the timing circuit generates a disabling signal which is fed to a silicon controlled rectifier connected to the electric heating element. The silicon controlled rectifier turns off, interrupting the current flow to the electric heating element and allowing the curling iron to cool down.

It is a principal object of the present invention to provide a curling iron having a safety circuit which interrupts the flow of electric power to an electric heating element after a preselected time interval.

It is another object of the present invention to provide a curling iron having a safety circuit having a timing feature which is reset each time the curling iron is actually used.

It is a still further object of the instant invention to provide a curling iron which can heat to its operating temperature rapidly and, upon reaching its operating temperature, consume only small amounts of electrical energy;

It is still another object of the present invention to provide a curling iron which upon heating to its operating temperature provides a visual indication that it is ready for use;

Other objects and uses of the instant invention will become obvious to one skilled in the art upon a perusal of the following specification and claims in light of the accompanying drawings.

DESCRIPTION OF THE PREFERRED EMBODIMENT

Figure 1:
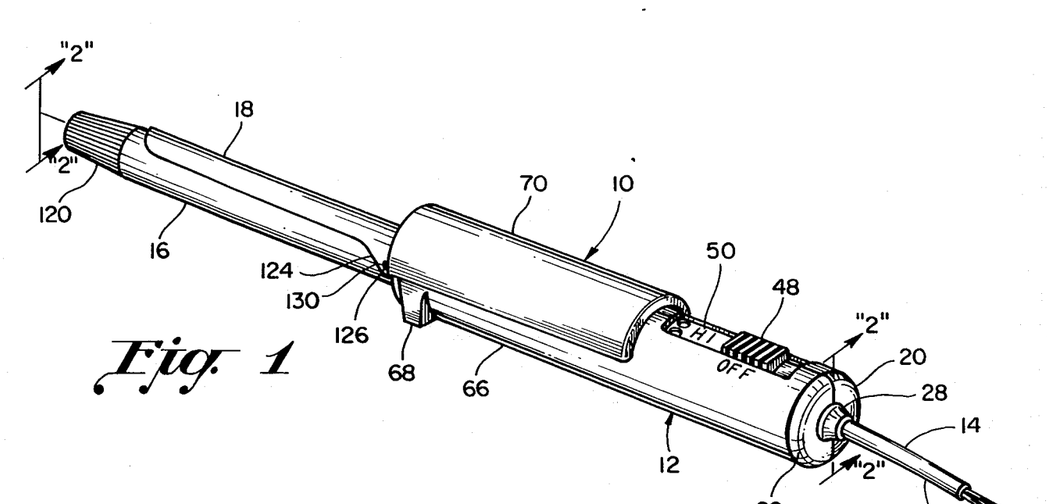
FIG. 1 is a perspective view of a curling iron embodying the instant invention.

Referring now to the drawings, and especially to FIG. 1, an electric or electronic curling iron generally indicated by numeral 10 and embodying the present invention is shown therein. The electric curling iron 10 has a handle portion 12 having an electric cord 14 connected thereto to supply electrical energy to the curling iron. A heated barrel 16 is mounted coaxially with respect to the handle portion 14, extending from the end opposite from the one to which the cord is connected. Also mounted on the handle 12 is a clamp 18 which is pivoted to handle 12 and is biased to the position shown in FIGS. 1-3 engaging the barrel 16.

Figure 2:
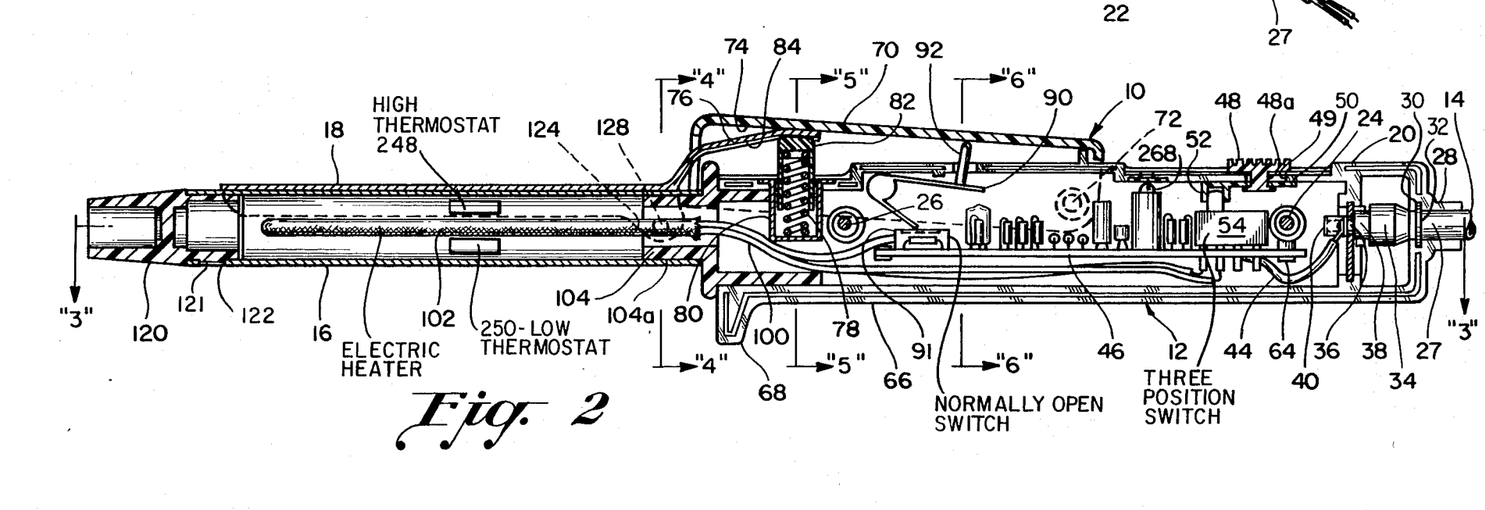
FIG. 2 is a sectional view of the curling iron of FIG. 1 taken substantially along line 2—2 of FIG. 1.

The handle 12 is comprised of a pair of mating plastic handle members 20 and 22, respectively, which are connected together by a pair of threaded fasteners, respectively numbered 24 and 26. The handle portions 20 and 22 are formed to define at one end of handle 12 a cylindrical sleeve 28 which receives a portion of the power cord 14 in rotatable engagement therewith. The sleeve 28 includes a shoulder portion 30 which engages a ring 32 on the power cord to prevent it from being moved axially with respect to the housing. The power cord terminates in a rotatable pin connection 34 having a central pin contactor 36 and a sleeve-like contactor 38 connected thereto. A spring loaded connector 40 engages the pin 36 in good electrical conduction therewith. A sleeve connector (not shown) engages the sleeve 38 in good electrical conduction therewith as it is well known in the art. The sleeve like conductor 38 is connected by a power lead 44 to an electronic circuit board 46.

Figure 6:
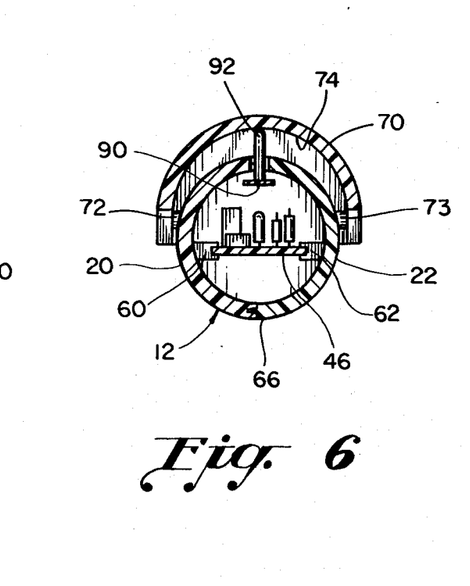
FIG. 6 is a sectional view taken substantially along line 6-6 of FIG. 2.

The electronic circuit board 46 controls the current flowing to other portions of the electronic curling iron 10 as will be explained in detail hereinafter. To permit manual control of the energizaion of the curling iron 10, there is provided a slide switch actuator 48 which is mounted for limited movement on the top of the handle 12. A flat plate 50 is held in grooves in the handle members 20 and 22 and is clamped between such handle members. The plate 50 and the adjacent portions of handle members 20 and 22 are formed with an elongated opening 49 through which a shank portion 48a on switch actuator 48 extends to connect to a toggle actuator 52. The toggle actuator 52 is in turn connected to a three-position, double pole slide switch 54 on the electronic circuit board 46. As will be explained in more detail hereinafter, the slide switch has a center off position, a rearward low heat position, and a forward high heat position. In the showing of the switch 54 in both FIGS. 7 and 8, the contact bridging members which move together are shown in solid lines in the high temperature setting and in dashed lines in the low temperature setting. As will be explained below, the bridging members move through an intermediate position in going between the high and low positions and in this intermediate position bridge the adjacent contacts from the other two positions. The electronic circuit board is mounted within the handle 12 on a pair of forward mounting tabs 60 and 62 as may be seen in FIG. 6 and on a pair of rearward mounting tabs, one of which is shown as tab 64 in FIG. 2.

The handle 12 includes a bottom portion 66 which terminates in a forward heel rest 68 adapted to hold the barrel 16 of the curling iron 10 out of contact with a supporting surface when the iron is set down. The handle also includes a semi-cylindrical clamp actuator 70 and is pivotally mounted to the handle 12 by a pair of pivots, one of which is shown as 72 in FIG. 2. The clamp actuator 70 defines a semi-cylindrical camming surface 74 which is adapted to engage a lever arm 76 of the hair retaining clamp 18. The actuator 70 is forced outwardly by a coil spring 78 which is received within a cup-shaped member 80 mounted in the handle 12. The spring 78 exerts force against a movable sleeve 82 which telescopes within the member 80 and contacts an underside portion 84 of the lever arm 76 to bias the clamp 18 against the barrel 16. The actuator 70 is also mechanically connected to a switch actuator 90 having a camming rod 92 formed integral therewith and made out of a resilient plastic material. The actuator 90 is somewhat V-shaped having the rod 92 extending from one leg of the V and with the other leg in engagement with a normally open switch 91. The switch responds to pressure from the actuator 90 so that when the clamp actuator 70 is depressed, the switch 91 is closed.

A plurality of power leads 100 extends from the printed circuit board 46 to an electric resistance rope heater 102. The electric resistance rope heater 102 extends into and is mounted in spaced proximity from the interior of the metal barrel 16, as is well known in the art. The metal barrel 16 engages a cylindrical sleeve member 104 of a barrel support 106. As may best be seen in FIG. 3, the barrel support 106 has a portion 108 which extends within the end of the handle 12 and is retained by the clamping engagement of the handle members 20 and 22. A pair of interengaging annular rings, respectively numbered 110 and 112, on the handle 12 cooperate with the portions of the support 106 to prevent axial displacement of the support 106 with respect to the handle 12.

At the end of the barrel 16 away from the handle 12, there is provided a plastic tip or closure 120 which is retained thereon by an integrally formed flexible protuberance 121 which engages an opening 122 in the side of the metal barrel 16 adjacent the end, as shown in FIG. 2.

Figure 3:
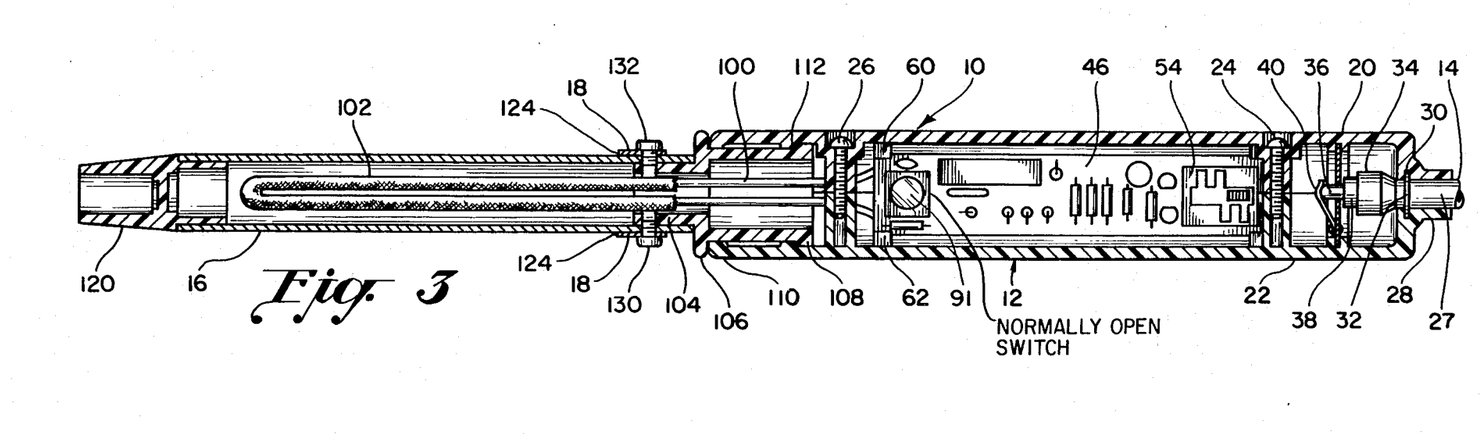
FIG. 3 is a sectional view taken substantially along line 3—3 of FIG. 2 and having a clip actuator removed to show details of the interior of the curling iron.
Figure 4:
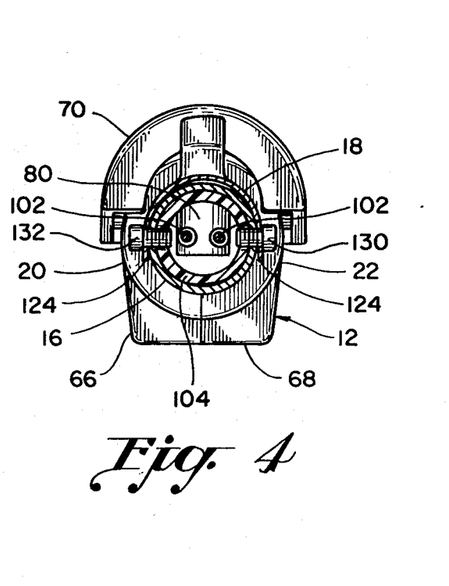
FIG. 4 is a sectional view taken substantially along line 4-4 of FIG. 2.
Figure 5:
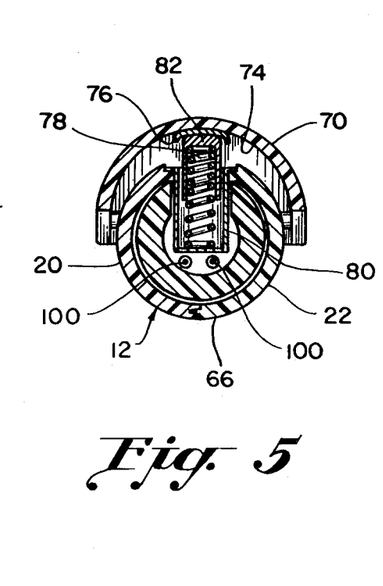
FIG. 5 is a sectional view taken substantially along line 5-5 of FIG. 2.

For the purpose of pivotally mounting the hair clamp 18, there are provided a pair of spaced parallel ears 124 extending on either side of the metal barrel 16 and having openings 128 formed therein to receive a pair of mounting screws, respectively numbered 130 and 132, as shown in FIGS. 3 and 4. The screws 130 and 132 are threadedly received in the sleeve 104 of the support 106 and serve the functions of securing the metal barrel 16 to the support 106 and also pivotally connecting the hair clamp 18 to the metal barrel 16.

Figure 7:
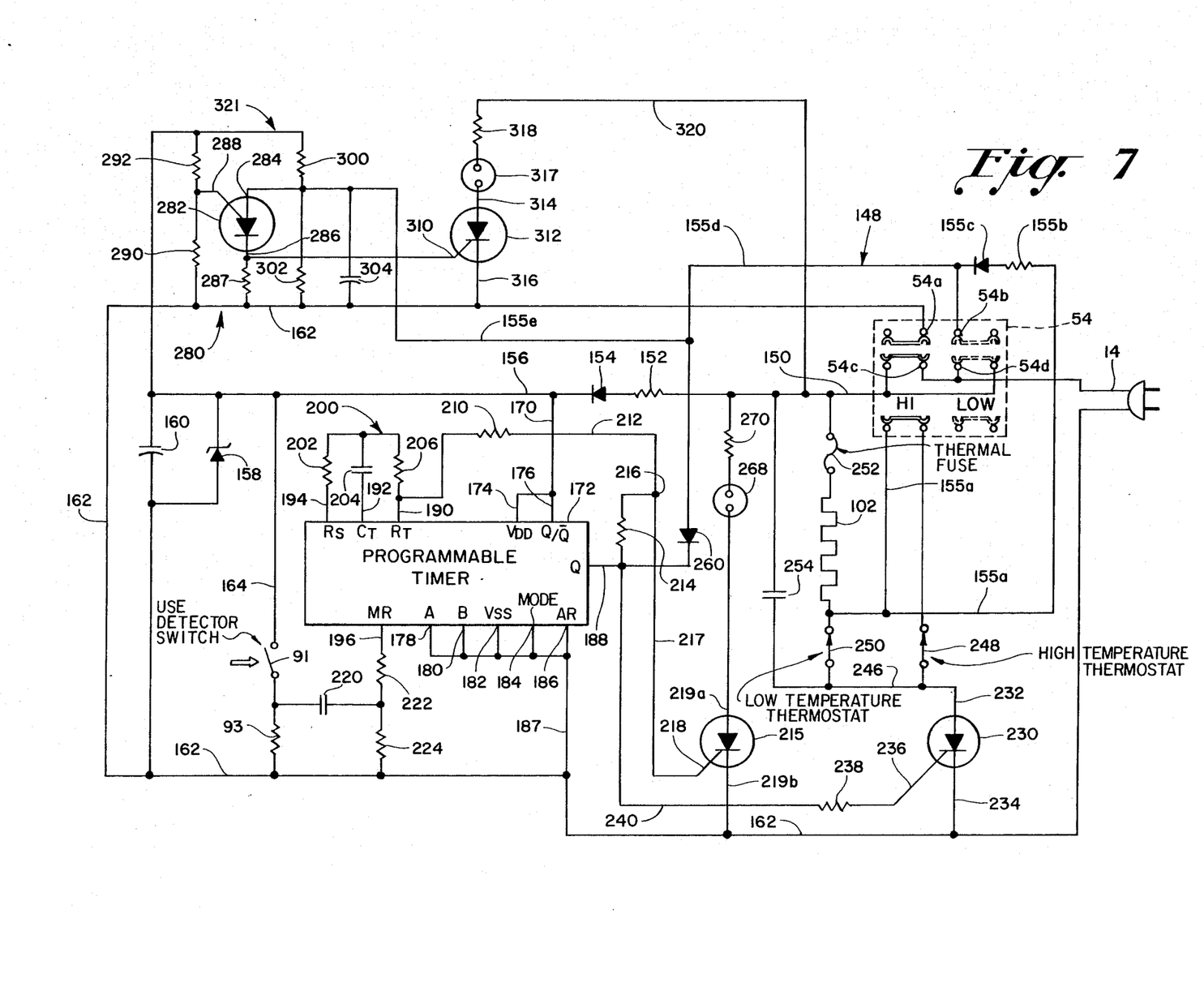
FIG. 7 is a schematic diagram of an electronic safety circuit connected to a single electric heater which comprises a portion of the inventive curling iron.

Turning now to FIG. 7 of the drawings, there is shown a preferred embodiment of an electronic safety circuit 148 utilizing the single electric heater 102. The circuit 148 which is mounted on the printed circuit board 46, includes the switch 54 to which one lead of the power cord 14 is connected. The switch 54 is connected to a lead 150. The lead 150 is connected to a resistor 152 and a diode 154 to supply low voltage rectified current to other portions of the circuit 148. Similarly, a lead 155a is connected to the switch 54 and to a resistor 155b and a diode 155c to supply low voltage rectified current separately to a lead 155d. A lead 156 is connected to the diode 154. A zener diode 158 and a parallel capacitor 160 are connected to lead 156 to regulate its voltage. A common lead 162 is also connected to the capacitor 160 and the zener diode 158. A lead 170 is also connected to the diode 154 to connect lead 15 to a digital timer 172. The digital timer 172 is in the present embodiment a Motorola MC 14541B programmable timer having its $V_{DD}$ pin 174 and a Q/$\bar{Q}$ pin 176 both strapped to the lead 170 to receive the potential from the lead 156. An A terminal 178, a B terminal 180, a $V_{ss}$ terminal 182, a mode terminal 184 and an AR terminal 186 are all strapped to a lead 187, which is connected to the common lead 162. The timer 172 also includes an output pin 188, an $R_t$ pin 190, a $C_t$ pin 192, an $R_s$ pin 194 and an MR pin 196. A timing network 200 comprised of a resistor 202, a capacitor 204 and another resistor 206 is connected to the programmable timer 172. The resistor 202 is connected to the $R_s$ pin 194, the resistor 206 is connected to the $R_t$ pin 190 and the capacitor 204 is connected to the $C_t$ pin 192 to provide frequency adjusted clock signals for the programmable timer. The pin 190 is also connected to a resistor 210 which is connected by a lead 212 to a silicon controlled rectifier 215. Resistor 214 is connected to the output terminal 188 of the programmable timer. The resistor 214 by being connected to the lead 212 forms a summing junction 216 with the resistor 210. The summing junction 216 is connected by a lead 217 to a gate electrode 218 of the silicon controlled rectifier 215. The silicon controlled rectifier 215 also has an anode 219a and a cathode 219b.

The switch 91, which is connected to the common lead 162 by a resistor 93, is closed whenever the barrel clamp 18 is opened to allow the user to release or wind a fresh lock of hair about the barrel 16. When the switch 91 is closed, a pulse is provided to a capacitor 220 which is connected to a resistor 222 connected to the MR pin 196 of the programmable timer 172 and a resistor 224 connected to the common lead 162. The pulse causes the programmable timer 172 to be reset to 0. Thus, each time the clip 18 is opened to wind or unwind a lock of hair around the barrel 16, the programmable timer 172 is reset to 0. In the event that the programmable timer 172 is not reset to 0 while the circuit 148 is energized, an output signal is provided at the pin 188 after 15 minutes when the programmable timer 172 reaches a time-out condition. The output signal is fed to a silicon controlled rectifier 230 having an anode 232, a cathode 234 and a gate electrode 236. The gate electrode 236 is connected by a resistor 238 to a lead 240 which is connected to the output pin 188. The silicon controlled rectifier 230 is connected at its anode 232 to a power lead 246. The power lead 246, in turn, is connected to a first thermostat 248 and a second thermostat 250. Thermostat 250 is connected directly in series with the electric rope heater 102, which is connected in series with a fuse 252. The fuse 252 is connected to the power lead 150 to receive alternating current therefrom. A by-pass capacitor 254 is connected between the lead 150 and the lead 246 to prevent switching transients from affecting the operation of the programmable timer 172. Thus, in normal operation, the gate 236 of the silicon controlled rectifier 230 is biased high by a voltage supplied by the programmable timer 172. When the programmable timer 172 times out, the terminal 188 drops to a low voltage blocking current flow through the resistor 238 to the gate 236 causing the silicon controlled rectifier 230 to turn off and thereby interrupt the electric power flow through the electric rope heater 102, turning the electric rope heater 102 off.

The thermostat 250 is a low temperature thermostat while the thermostat 248 is a high temperature thermostat opening at a temperature about 40° C. higher than thermostat 250. With switch 54 in the solid line position shown in FIG. 7, the two thermostats 248 and 250 are in the circuit which results in the high temperature thermostat 248 controlling since the power to heater 102 is not cut off until both thermostats open. On the other hand, in the low switch setting of switch 54, only thermostat 250 is in the circuit and it controls the flow of power to heater 102.

The anode 219a of the silicon controlled rectifier 215 is connected to a neon lamp 268 which is connected in series with a resistor 270. The resistor 270 is energized by the potential at the lead 150 to which it is connected. Thus, when the programmable timer 172 has not timed out, the silicon controlled rectifier 215 is switched on, causing the neon lamp 268 to be illuminated, indicating to the user that the electric curling iron 10 is being energized.

In order to make the user immediately aware of the fact that the timer 172 has caused an interruption of power to the heater 102 when it has timed out, means are provided to cause the neon lamp 268 to turn on and off rapidly. When the programmable timer 172 times out, the potential at the pin 188 is no longer sufficient to keep the silicon controlled rectifier 215 turned on. An alternating potential from the pin 190 is applied through the resistor 210 to the gate 218 of the silicon controlled rectifier 215. Since AC potential is across the anode 219a and the cathode 219b, the silicon controlled rectifier 215 switches on and off under the influence of the alternating potential from pin 190, thereby causing the neon lamp 268 to blink, indicating a timed out condition.

A latch circuit 280 is connected to the leads 162 and 156 to be energized thereby. The latch circuit 280 comprises a programmable unijunction transistor 282 having an anode 284, a cathode 286 and a gate 288 biased by a voltage divider pair consisting of a resistor 290 connected to the lead 162 and a resistor 292 connected to the lead 156. The anode 284 is connected to a resistor 300 and connected to a resistor 302, which is connected to the lead 162. Resistors 292 and 300 are connected together. A charging capacitor 304 is connected from the junction of the resistors 300 and 302 and to the lead 162.

The resistor 155b and the diode 155c are connected by the lead 155d to a lead 155e. The lead 155e feeds the rectified current to the anode 284 of the programmable unijunction transistor 282. The lead 155a is also connected to the junction of the electric rope heater 102 and the thermostat 250. The cathode 286 of the programmable unijunction transistor 282 is connected to a gate electrode 310 of a silicon controlled rectifier 312. The silicon controlled rectifier 312 has an anode 314 and a cathode 316. The anode 314 is connected to a network comprising a green neon lamp 317 to which is connected a current limiting resistor 318. A lead 320 connects the resistor 318 to AC supply line 150. The green neon lamp 317 indicates when the curling iron 10 has reached its selected temperature and it remains illuminated even during the normal cycling of the thermostat 250 or 248 so that the user may be assured that the temperature of the curling iron is high enough for satisfactory operation. Without the latch circuit 280, the user would tend to be confused by the cycling of the lamp 317 as the curling iron is energized and de-energized.

The programmable unijunction transistor 282, silicon controlled rectifier 312, green neon lamp 317 and associated resistors and capacitors comprise a temperature ready indicating circuit 321. When the electric rope heater 102 reaches its preselected operating temperature with switch 54 in its low setting, the normally closed thermostat 250 opens, thereby applying high potential through the lead 155a to the resistor 155b and the diode 155c. A rectified potential is fed to the anode 284 of the programmable unijunction transistor 282. Capacitor 304 begins charging and after a time interval the voltage at the anode 284 will exceed that supplied to the gate 288 by the voltage divider resistors 290 and 292. The programmable unijunction transistor 282 will then switch on, raising the potential at the cathode 286 and providing gate drive current to the gate 310 of the silicon controlled rectifier 312 to switch it on, thereby illuminating neon lamp 317. When the green neon lamp 317 is thus illuminated, it indicates to the user that the curling iron is at operating temperature.

Since the programmable unijunction transistor 282 latches on, normal temperature cycling of the thermostats 250 or 248 will not extinguish the green neon lamp 317. Diode 260 is included to extinguish the green neon lamp 317 when the programmable timer 172 times out.

The same sequence occurs with the switch 54 in the high heat position with the neon lamp 317 being illuminated when both of the thermostats 250 and 248 have opened. In the event that the switch 54 is set with its contacts in the solid line position (to the left as viewed in FIG. 7) which is the high heat position, the thermostat 248 will control the heater 102 to a higher temperature than when controlled by only the thermostat 250. In that event, the green neon lamp will be illuminated when both thermostats 248 and 250 have opened upon reaching its operating temperature. When the switch 54 is moved between its operating positions as described above, the contacts 54a and 54b are bridged, causing the programmable unijunction transistor 282 to unlatch, thereby resetting the temperature ready indicating circuit 321.

Figure 8:
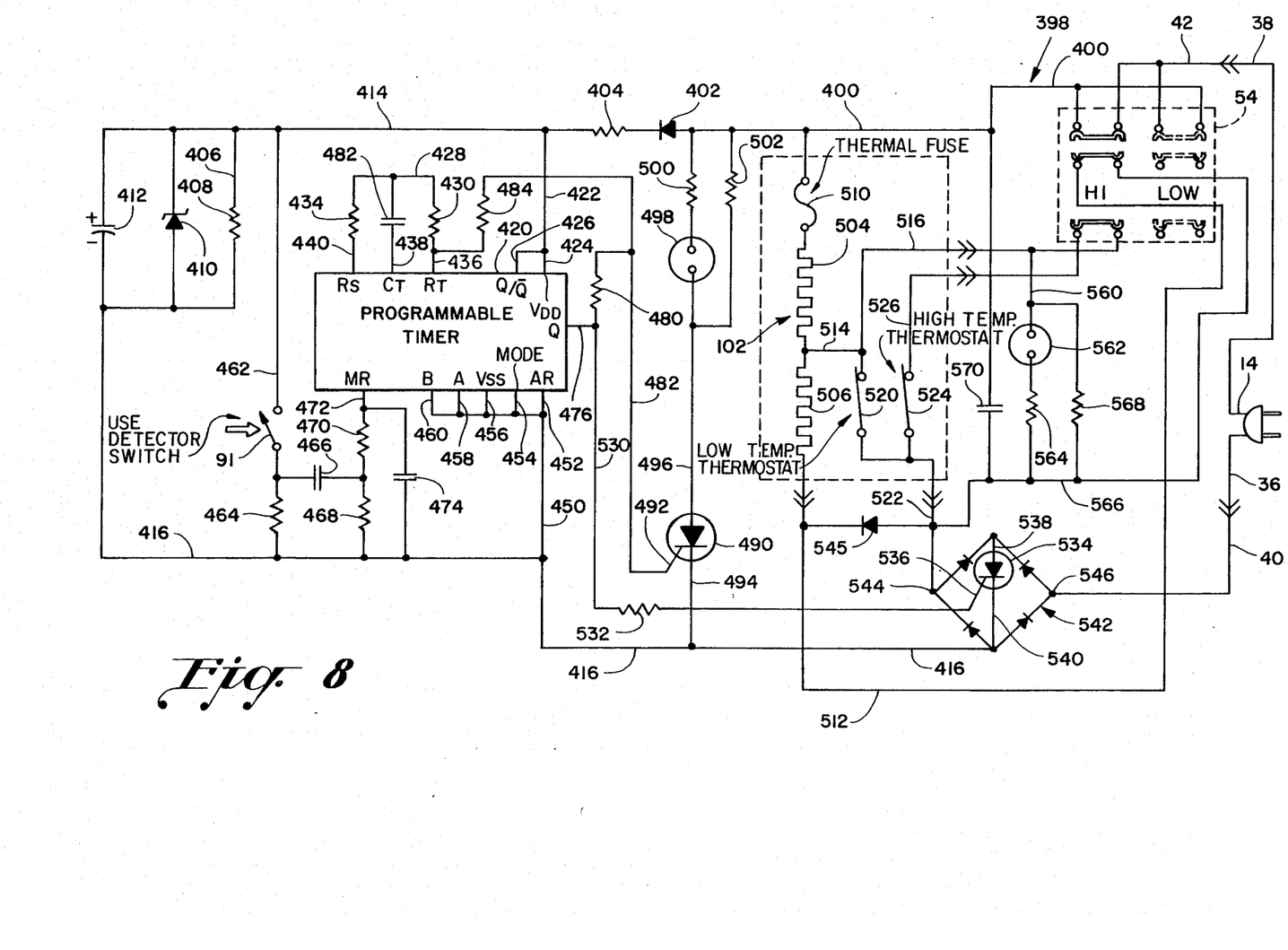
FIG. 8 is a schematic view of an alternative electronic safety circuit connected to a pair of electric heating elements controlled by a pair of thermostats for effecting rapid initial heating of the inventive curling iron.

In a second alternate embodiment, as may best be seen in FIG. 8, a circuit 398 is energized from a source of electrical energy supplied to the line cord 14. The electrical energy is fed to a first lead 400 whereupon it is half wave recified by a diode 402 connected thereto. A voltage dropping resistor 404 is fed by the half wave rectified current from the diode. A regulation section 406 consisting of a resistor 408, a zener diode 410 and an electrolytic capacitor 412 all of which are connected in parallel, is series connected to the lead 414 which is energized by the resistor 404 and is also connected to a common lead 416.

A Motorola MC 14541B programmable timer, herein identified by numeral 420, is energized with the regulated voltage through a lead 422 connected to the $V_{DD}$ pin 424 and $Q/\overline{Q}$ pin 426. A timing network 428 consisting of a resistor 430, a capacitor 432 and a resistor 434 are respectively connected to an $R_t$ pin 436, a $C_t$ pin 438 and an $R_s$ pin 440 of the programmable timer 420. The common lead 416 is connected via a lead 450 to a plurality of terminals of the programmable timer 420, including an AR terminal 452, a mode terminal 454, a $V_{ss}$ ground terminal 456, an A terminal 458 and a B terminal 460 to bias all of them at the common voltage. The lead 462 is connected to the regulated voltage supply lead 414 and to the switch 91. The switch 91 is connected to ground via a resistor 464, which has connected thereto a differentiation network consisting of a capacitor 466 and a resistor 468 also connected to ground. A resistor 470 connects a master reset pin 472 to the capacitor 466 and resistor 468. A noise by-pass capacitor 474 connects the pin 472 to ground to prevent the programmable timer 420 from being reset by spurious signals. In operation, when the switch 54 is set into either its high or low temperature positions to energize the circuit 398, the programmable timer 420 is automatically reset and begins timing an interval of 15 minutes. When the 15 minute interval is reached, an output pin 476 of the timer goes low, indicating that a time-out period has been reached. In the event that the switch 91 has been closed by a user operating the clamp 18, the timer will have been reset back to 0 at each such switch closure and the output terminal 476 will remain in its high voltage state.

A resistor 480 is connected to the output terminal 476 and to a lead 482. The lead 482 is connected via a resistor 484 to the timer pin 436. The lead 482 is also connected to a silicon controlled rectifier 490 at a gate 492. A cathode 494 of the silicon controlled rectifier 490 is connected to the common lead 416, and an anode 496 is connected to a neon lamp 498. The neon lamp 498 is connected via a current limiting resistor 500 to the lead 400 to receive alternating current therefrom. A shunt resistor 502 is connected in parallel with the neon lamp 498 and the resistor 500 to bypass leakage current flowing through the SCR 490. Thus, when the circuit is energized, the silicon controlled rectifier 490 is turned on, thereby energizing the neon lamp 498 indicating to a user that the curling iron 10 is operating.

In the alternative embodiment of FIG. 8, the electric rope heater 102 can either be comprised of a single section or a pair of series connected sections 504 and 506. The heater section 504 is connected via a thermal fuse 510 to the alternating current line 400. The heater section 506 is connected to a lead 512, which is connected to the switch 54 for energization by alternating current. A tap 514 is connected to the junction of electric heater sections 504 and 506 and is connected via a lead 516 to the switch 54. A first thermostat 520 is connected to the tap 514 and to a power lead 522. A second thermostat 524 is connected to a lead 526 which is connected to the switch 54. As will be explained in more detail below, the first thermostat 520 is a lower temperature thermostat, being designed to open at a lower temperature than the thermostat 524.

In order to control the heater 102 from the programmable timer 420, a lead 530 is also connected to the output pin 476. A resistor 532 is connected to the lead 530 and is connected to a silicon controlled rectifier 534. The silicon controlled rectifier 534 includes a gate terminal 536, an anode 538 and a cathode 540. The silicon controlled rectifier 534 is connected across the output leads of a full wave rectifier bridge 542. The full wave rectifier bridge 542 has a pair of input terminals 544 and 546. The terminal 544 is connected to the thermostats 520 and 524 through the lead 522. The input terminal 546 is connected to the lead 40. The silicon controlled rectifier 534 controls the flow of electric current through the rectifier bridge 542, which is used to energize the heater 102. Thus, as long as the programmable timer 420 is not timed out, the silicon controlled rectifier 534 remains conducting, allowing electric current to flow through the electric rope heater sections 504 and 506.

Considering first the low heat position of switch 54 with the contact bridging element to the right as shown in FIG. 8, the low temperature thermostat 520 will be the only thermostat involved as the circuit through thermostat 524 will be open with the switch in the "low" position. During the initial heat-up period, only the portion 504 of heater 102 is in the circuit resulting in very rapid heat up. When the curling iron reaches temperature, the thermostat 520 opens, causing the current to flow through diode 545 to the series connected heaters 504 and 506. This circuit connection provides reduced wattage from the heater 102.

When the switch 54 is in the high temperature position with the bridging element to the left as viewed in FIG. 8, the diode 545 is bypassed by the leads 566 and 512 when both of the thermostats 520 and 524 are open. Upon initial heat-up, both of the thermostats 520 and 524 are closed, thereby placing line potential across the single heater 504 heating up the curling iron very rapidly. In this rapid heat up, the curling iron consumes approximately five times the amount of power that would be consumed with the series connection of the heaters 504 and 506. As the curling iron heats up, the low temperature thermostat 520 opens first and upon reaching a temperature close to the operating temperature, the high temperature thermostat 524 opens, thereby switching the electric heater sections 504 and 506 into a series connection, which consumes less power but which is sufficient to maintain the curling iron 10 at operating temperature.

A circuit is also provided for indicating to the user when the curling iron 10 has reached operating temperature. A lead 560 is connected to the lead 516 and is also connected to a neon lamp 562. A current limiting resistor 564 is connected to the neon lamp 562 and to a lead 566. A shunt resistor 568 is connected in parallel with the lamp 562 and the resistor 564. In the low heat setting of switch 54, as long as the electric curling iron 10 is in the initial heat up state, the thermostat 520 remains closed, thereby by-passing current from the neon lamp 562. When thermostat 520 opens, switching the electric heater sections 504 and 506 into series connection and indicating that the curling iron 10 is at operating temperature, the a portion of the line potential is placed across the neon lamp 562 and the resistor 564 causing the neon lamp 562 to be illuminated. It should be understood that the thermostat 520 opens at a sufficiently low temperature that it has no effect in controlling energization of the heating element 102 as use continues after initial heat-up. Similarly, in the high heat setting of switch 54, thermostats 520 and 524 must both open to cause the neon lamp 562 to be illuminated. After the initial heat-up, sufficient heat is delivered by the heating element 102 to maintain the thermostats 520 and 524 open continuously. In an actual embodiment of the invention including the circuit of FIG. 8, the low temperature thermostat 520 was set to open at 110° C. and provided a barrel temperature of 104° C. The high temperature thermostat 524 was selected to open at 148° C. and provided a barrel temperature of 135° C. The heat loss in normal operation in the low heat setting of switch 54 results in the thermostat 520 remaining open which also causes the neon lamp 562 to remain on. In order to prevent false triggering of the electronic circuitry due to opening and closing of the thermostats, a by-pass capacitor 570 is connected across lead 400 and lead 566.

It should be appreciated that the neon lamp 562 in the circuit of FIG. 8 performs the same function as the lamp 317 in the circuit of FIG. 7, providing a constant signal once the curling iron is heated up to temperature. Use of the two heating element sections 504 and 506 allows the use of a circuit including the thermostats 520 and 524 to maintain ready light illuminated without use of latch circuit 280.

The thermostats 248, 250 and 520, 524 are shown in FIG. 2 of the drawings, and such thermostats would be positioned in the barrel 16 near the midpoint as is well known in the curling iron art. The thermostats may take the form of the small tubular thermostats which are widely available for appliance controls and which are simply supported by the rope heaters to which they are connected and may be separated from the barrel by a sleeve of woven fiberglass material wrapped around the thermostats and the rope heater in a conventional manner.

It may be appreciated that the instant invention provides an electronic curling iron 10 which has new and improved safety features in that when the curling iron 10 is not being used, as indicated by a lack of movement of the hair clamp 18, a highly accurate digital timer causes the electric heating element to be de-energized at the end of the 15 minute interval. Furthermore, the curling iron 10 is adapted to be rapidly heated by automatically shunting one of the two segments of the heater during the heat-up phase and causing the two segments to be shifted into series connection upon reaching operating temperature to conserve electrical energy. The curling iron 10 also includes accurate indicating features allowing the user to know when the curling iron has been energized, when it has been de-energized automatically and when it has reached operating temperature. The latch circuit associated with the temperature ready light maintains the light illuminated even during the normal cycling of the thermostat in maintaining the curling iron at the desired heat level.

While there has been illustrated and described a particular embodiment of the present invention, it will be appreciated that numerous changes and modifications will occur to those skilled in the art, and it is intended in the appended claims to cover all those changes and modifications which fall within the true spirit and scope of the present invention.

What is claimed as new and desired to be secured by Letters Patent of the United States is:

1. A curling iron for conditioning a lock of hair by applying heat, comprising: a handle, a barrel connected to said handle, means connected to said handle for receiving electric current from a suitable source; electrically energized heater means connected to said current receiving means for energization by said electric current for heating said barrel; said heating means comprising an electric resistance heater mounted in good heat conduction relationship with said barrel, a hair clamp pivotally mounted to said barrel for holding a lock of hair wound thereabout in good heat conducting engagement with said barrel; sensing means for sensing when said clamp has been opened to release said lock of hair or to allow another lock of hair to be wound about said barrel and producing an in-use signal in response thereto; and heating control means including means responsive to said in-use signal connected to said heater means for de-energizing said heating means a preselected time interval after receiving said in-use signal from said sensing means.

2. A curling iron for conditioning a lock of hair by applying heat, as defined in claim 1, further comprising first visual indicating means providing a first visual output in response to said heater means being energized and providing a second visual output in response to said heater means being de-energized by said heating control means.

3. A curling iron for conditioning a lock of hair by applying heat, comprising, a nonconducting handle; an electric power cord connected to said nonconducting handle for receiving electric current from a suitable source; a metal barrel connected to said handle for receiving a lock of hair to be conditioned; an electric resistance heater mounted within said metal barrel in good heat conducting relationship therewith and connected to said electric cord to be energized by said electric current to provide heat to said lock of hair wrapped around said metal barrel; a clamp pivorally connected to said metal barrel for holding a lock hair in good heat conducting contact with said barrel, said clamp having a hair engaging blade and a short moment arm opposite said hair engaging blade, a lever connected to said barrel and contacting said short moment arm adapted to open said clamp when a force is applied thereto; a switch connected to said clamp, said switch generating an in-use signal in response to the opening of said clamp; a resettable electronic timing circuit connected to said switch, said timing circuit being reinitialized each time said switch generates said in-use signal, said timing circuit after a switch closure producing a time-out signal at a preselected time interval after the last in-use signal is received; and a solid state switch connected in series between said electric heater and said electric power cord having a control electrode connected to receive said time-out signal, thereby causing said solid state switch to interrupt a flow of electric current to said electric heater at the end of said preselected time interval.

4. An electric curling iron for treating a lock of hair comprising: a cylindrical handle; a metallic barrel connected to said cylindrical handle; an electric heating element mounted within said metallic barrel in good heat conducting relation therewith; a clamp pivotally connected to said barrel for holding securely a lock of hair thereagainst; a switch connected to said clamp and changing state in response to the opening or closing of said clamp; a resettable timer connected to said switch and being started when said switch is opened or closed, said timer producing an output signal when a predetermined interval has elapsed from the preceding change of state of said switch; a heater control switch responsive to said output signal connected to said electric heating element and interrupting a flow of electric current therethrough upon receipt of said output signal.

5. A curling iron for conditioning a lock of hair by applying heat, comprising: a handle, a barrel connected to said handle; means connected to said handle for receiving electric current from a suitable source; electric heater means connected to said current receiving means for energization by said electric current for heating said barrel; first signal means producing a signal in response to energization of said heater means; and heating control means connected to said heater means for disabling said first signal means and said heater means; first and second thermostats connected in circuit with said heater means and located within said barrel having different predetermined temperatures at which each opens, said thermostats being connected in parallel with each other to control the rate of heating of said barrel and the temperatures thereof; a manually operable control means connected in circuit with said electric heater means and said thermostats having high and low heat positions in which one or the other of said thermostats controls the temperature of said barrel to a selected high or low temperature, a temperature ready signal for producing a signal when said barrel has been heated to a selected one of said high or low temperatures for curling hair and to continue signaling such ready condition until said heater means is disabled.

6. The curling iron of claim 5 having a latch circuit connected to energize said ready signal, said latch circuit locking said ready signal on in response to said barrel reaching its predetermined temperature and turning off said ready signal in response to said heating control means disabling said first signal means and said heater means.

7. The curling iron of claim 5 wherein said manually operable control means connects one or both of said thermostats in circuit with said heater means, said heater means including two series connected resistance elements, said thermostats being connected in series with one of said resistance elements and in parallel with the other of said resistance elements to provide a fast heat up of said barrel by supplying more heat energy to said barrel during the initial heat up period, said thermostats opening at preselected temperatures to provide different barrel temperatures at selected settings of said control means, both of said thermostats being open after said initial heat-up period and said barrel being heated by both of said resistance elements connected in series.

* * * * *